Aug. 4, 1953 G. J. AGULE 2,648,025
ELECTRON DISCHARGE DEVICE
Filed April 1, 1950 2 Sheets-Sheet 2

INVENTOR
GEORGE J. AGULE
BY
Pennie, Edmonds, Morton & Barrows
ATTORNEYS

Patented Aug. 4, 1953

2,648,025

UNITED STATES PATENT OFFICE 2,648,025

ELECTRON DISCHARGE DEVICE

George J. Agule, Stamford, Conn., assignor to Machlett Laboratories, Incorporated, Springdale, Conn., a corporation of Connecticut Application April 1, 1950, Serial No. 153,371

13 Claims. (Cl. 313—60)

This invention relates to bearing structures for use within vacuum envelopes. It is an object of the invention to eliminate sliding friction entirely and thus provide for smooth, quiet operation and very long life.

In the prior art the use of ball bearings within a vacuum envelope has been confined to rotating target structures in X-ray tubes.

It is known that lubrication of vacuum bearings is necessary to prevent pitting and scoring resulting from metal to metal contact. Metals having low affinity for bearing metals have been commonly used as "lubricants" because they are non-volatile and hence will not destroy the vacuum. These metals are in effect cold welded to the balls by various processes, such as that described in U. S. Patent No. 2,378,588, but they will not, under normal rolling conditions, weld to races because there is not sufficient plastic deformation of the "lubricant" accompanying the high temperature and great pressure. Actually these low affinity metals are not lubricants in the conventional sense because they do not lessen the sliding friction between the bearing surfaces but rather offer a continuous protective non-adhesive layer between ball and race.

Despite advances in the art, the life of the bearing structure has remained relatively short due to wear, much of it caused by looseness which permits vibration and friction between the balls and races. Vibration causes the balls to deform and may cause bending of the shaft which will result in irregular wear. Vibration on occasion has also been responsible for hammering the target support stem out of line, and in especially serious cases has caused sympathetic vibration in equipment thereby blurring X-ray pictures. Looseness permits the balls to slide rather than roll within their races which in turn permits the lubricant to be plastically deformed, thus satisfying conditions for cold welding of lubricating metal to the race or exposing the unlubricated ball to the race.

In the prior art structure, many pieces have been placed immediately adjacent one another both in inner and outer race assemblies. As in all such machined parts, these pieces have been subject to certain tolerances, and in addition allowance had to be made for fitting the parts together. The result was a degree of looseness, in both axial and radial directions, small in amount but important in effect, which would permit the races to become twisted out of alignment. Again, because twisting occurred in the races, some radial play had to be allowed so that the races would not bind the balls nor the balls wear uneven paths in the races.

But even if looseness and play were eliminated between balls and races, wear would still occur at ball to ball contact points where the relative velocity of one ball with respect to its neighbor is twice the individual ball surface velocity imparted by the driven race. Reduction of surface velocity by use of smaller diameter bearings and rotation of the shaft rather than the surrounding housing reduce wear only an insignificant amount. Introduction of bearing separators cuts the effective velocity to simply surface velocity, but the separators still present sliding contact and probably involve more area of contact than ball to ball. Furthermore, introduction of separators of necessity reduces the number of bearing-race contacts which decreases the load which the bearing can support.

Noise, while not in itself destructive, has proven annoying to operators and disconcerting to patients receiving X-ray treatment. In addition to vibrational noises, humming and clicking have caused complaints. Clicking occurs primarily when a tube is operated in a horizontal position and is due to the gravitational dropping of each ball just past the top of the race upon its predecessor, and humming is due to the rubbing together of the balls.

It is an object of my invention to reduce to a minimum all looseness and play in vacuum bearings. In order to do this, the number of parts in the bearing assembly is cut to a minimum, preferably by use of an integral bearing metal shaft at the center of the bearing system directly into which are cut the necessary inner raceways. Use of the integral shaft permits a great variety of designs of simplified outer race structures. Furthermore, the integral shaft is much stronger and has practically no tendency to bend out of shape.

It is another object of my invention to eliminate all sliding friction from the vacuum bearing structure. Inner raceways, with slopes oppositely disposed axially, are formed upon the shaft. Axial thrust, usually applied against the outer races, forces the balls up the inner race slopes. In so doing all radial looseness or play in the bearings is eliminated. All ball to ball sliding contact is also eliminated because as the balls go up the slopes they separate and maintain equidistant spacing so that the load will be equally distributed among all the balls of each bearing. In order that each outer raceway may function free of sliding friction, its radius of curvature should be greater than that of the balls.

Another object of my invention is to produce a bearing structure which is free of noise. Elimination of looseness and play will prevent vibrational noise and clicking, and separation of the balls, frictional humming.

For a better understanding of this invention reference is made to the following drawings.

Figure 1:
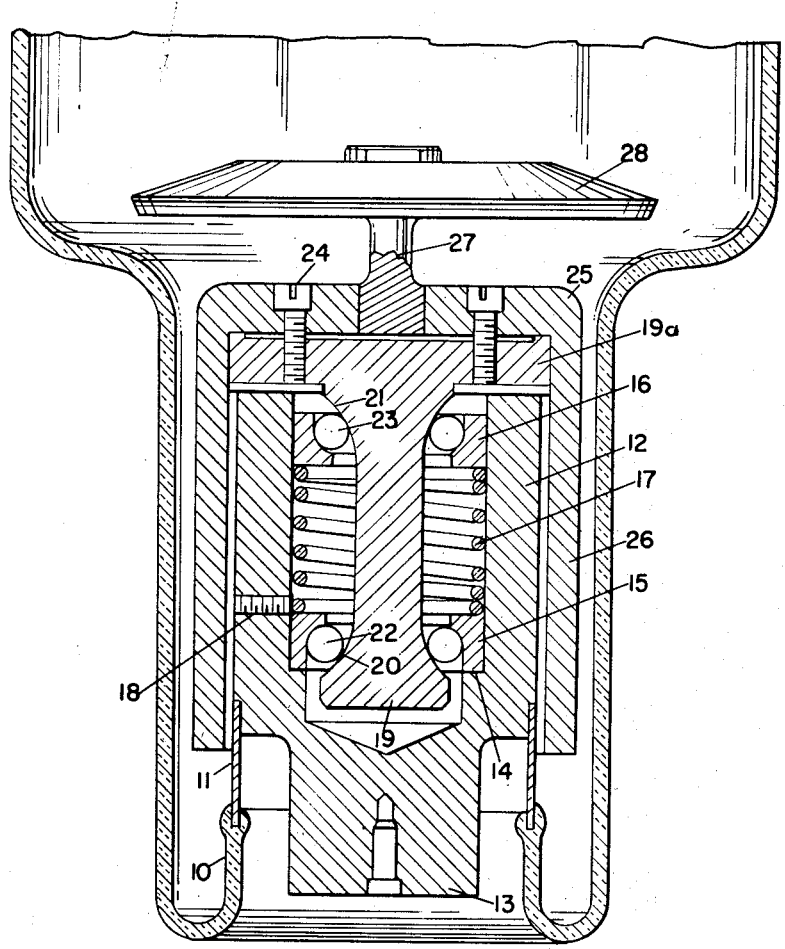
Fig. 1 illustrates the preferred form of this invention in which a bearing metal shaft is rotatable and the outer races are retained within a fixed housing and separated by a spring in compression.

In Fig. 1, the reentrant neck portion 10 of a glass vacuum envelope is sealed at Kovar collar 11 which is in turn affixed to cylindrical housing 12 which has an external stem 13 for cooling. Housing 12 is counterbored to produce a shoulder 14 upon which rests outer bearing race 15. Outer race 16 is separated from race 15 by spring 17 under compression. Radial set screws 18 hold race 15 in place. Central bearing metal shaft 19 has concave inner raceways 20 and 21 consisting of slopes inclined relatively to the axis of rotation against which raceways balls 22 and 23 are held by the outer races.

In the case of a rotating anode X-ray tube, a radial flange 19a at the target end of the shaft is affixed by means of axial screws 24 to rotor shoulder 25 which in turn supports the rotor 26 and the target support stem 27 atop which is mounted the rotating target 28.

In this preferred structure, outer race 15 is fixed in place while outer race 16 is free to move axially back and forth within the housing 12. The spring made of heat resistant material is in compression and supplies axial pressure on the outer race 16 tending to press the balls up the inner raceway slopes, thus simultaneously making the structure tight and separating the balls. As the target heats, the shaft will expand more rapidly than the housing because of the poor thermal path between the two. The balls will then tend to roll slightly down the inner raceway slopes but any such movement is opposed by the spring pressure which holds the balls in almost the same position as when cool and at rest.

Figure 2:
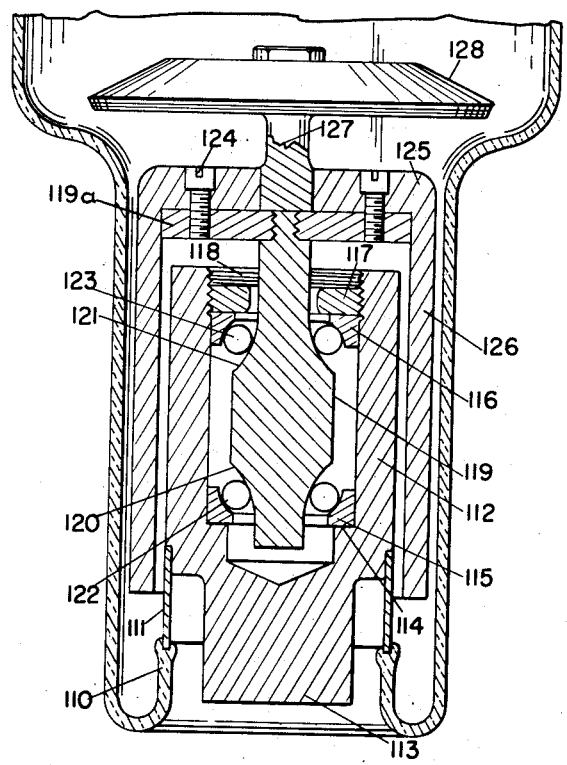
Fig. 2 illustrates another design in which the shaft is rotatable but which achieves axial loading without use of spring pressure.

Referring to Fig. 2, the reentrant neck portion 110 of a glass vacuum envelope is sealed to Kovar collar 111 which is sealed to cylindrical housing 112 which has an integral external stem 113 for cooling. Housing 112 is counterbored to produce shoulder 114 upon which rests outer race 115. Outer race 116 is separated from outer race 115 by the larger diameter portion of shaft 119, outer race axial pressure in this case being supplied by spanner type locking nut 117 screwed into the threaded end 118 of the housing. Central bearing metal shaft 119 has concave inner raceways 120 and 121 consisting of slopes inclined relatively to the axis of rotation against which raceways balls 122 and 123 are held by the pressure exerted by the outer races.

In the case of a rotating anode X-ray tube, a disc 119a mounted on the target end of the shaft is affixed by means of screws 124 to the closed end 125 of the rotor 126 and this end 125 carries the target support stem 127 atop which is mounted the rotating target 128.

With the structure so made, expansion of the rotating shaft in an amount in excess of that of the surrounding housing 112 will have the effect of causing the balls to move up the slopes of the bearing raceways on the shaft. Hence it is necessary in assembly to avoid tightening beyond the point of snugness lest the balls become wedged too tightly between the inner and outer raceways, resulting in binding in the bearings and danger of cracking the parts.

Figure 3:
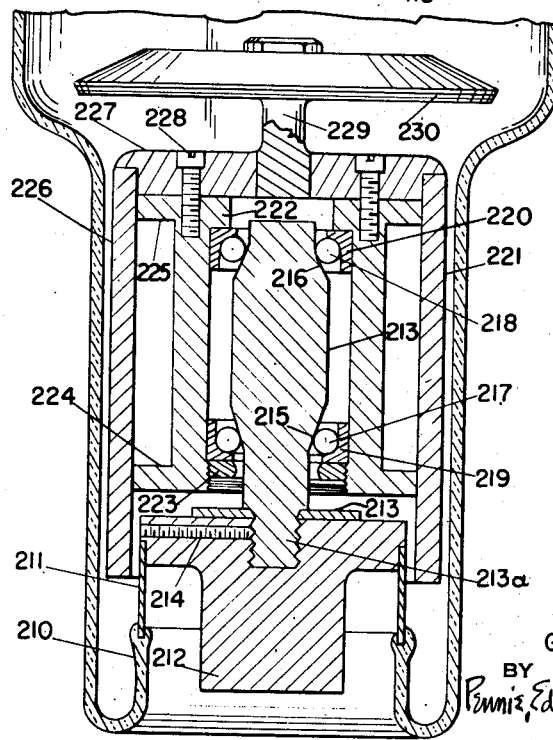
Fig. 3 illustrates another structure which does not use a spring and which has a fixed shaft and rotatable housing.

The structure illustrated in Fig. 3 has a Kovar collar 211 with which glass reentrant neck 210 and metal base and stem piece 212 are connected. In this instance, however, the bearing metal shaft 213 is stationary and has a threaded end 213a which screws into member 212 over a washer 213 and is held in place by radial set screw 214. Into the shaft are cut two raceways 215 and 216 which are essentially frustro-conical faces between two diameters of the shaft. The balls 217 and 218 are held in place by outer races 219 and 220 which are positioned within cylindrical housing 221 by a radial flange 222 at one end of the housing and a spanner type locking nut 223 threaded into its other end.

When used for X-ray purposes, the housing 221 may be supplied with radial flanges 224 and 225 which cut down heat flow between it and rotor 226. Housing 221 is affixed to a circular end piece 227 of the rotor by screws 228 and a support stem 229 for the target 230 fits within a hole in the end piece 227.

In this case the housing will expand faster than the shaft, producing movement tending to loosen the bearings; therefore, in order to keep the balls separated, they must be pressed well up the slopes on the shaft during assembly while cool.

In a structure of this type wherein the bearing shaft is stationary, one or both of the outer races may be subjected to spring loading as illustrated and described in connection with the Fig. 1 construction wherein the central bearing shaft is rotatable, the spring being placed between flange 222 and race 220 or between nut 223 and race 219 or both.

It can be seen that in essence this bearing arrangement involves the provision of two oppositely disposed slopes which act as inner raceways and opposed axial forces applied to outer raceways which are fixed by or yieldingly mounted for cooperation with the raceways formed by these slopes. The exact curvature of the inner raceways is not material, but a gentle slope is preferred, particularly in the Fig. 2 and Fig. 3 constructions, as it provides more satisfactory thermal adjustment. While the examples shown depict the inner race slopes as concave or conical, they could be slightly convex, but that is less desirable because it would require that the inner raceways be of greater width so that their slopes would be gentle. On the other hand, inner raceways may be merely concave grooves in the shaft as long as side walls are not made so steep that they tend to oppose the thermal adjustment.

Many combinations of the bearing types shown and obvious modifications thereof are possible. Bearing structures of this general type, while especially advantageous when used in X-ray tubes to support rotating targets, are useable in any electron tube. It is immaterial whether shaft or housing is rotatable or whether the raceways face one another or away from one another. Structures shown and discussed specifically herein are meant by way of example and not by way of limitation.

I claim:

1. An electron tube having an evacuated envelope and a rotatable electrode therein, the mounting for the rotatable electrode including an inner shaft having thereon inner ball bearing raceways including surfaces which slope relatively to the axis of rotation and are oppositely disposed and are wide spaced from one another relative to the diameters of the balls, outer ball races, sets of balls retained between the inner and outer race members which balls are forced up the inner raceway slopes by axial compression between said inner and outer race members, and supporting means preventing radial displacement of said outer races.

2. An electron tube having an evacuated envelope and a rotatable electrode therein, the mounting for the rotatable electrode including an inner shaft having thereon inner ball bearing raceways including concave surfaces which are inclined relatively to the axis of rotation and are oppositely disposed and are wide spaced from one another relative to the diameters of the balls, outer ball races, sets of balls which are retained between inner and outer race members and which are forced up the concave inner raceway slopes by axial compression between said inner and outer race members, and supporting means preventing radial displacement of said outer races.

3. An electron tube having an evacuated envelope and a rotatable electrode therein, the mounting for the rotatable electrode including an inner shaft having thereon inner ball bearing raceways including conical surfaces which are inclined relatively to the axis of rotation and are oppositely disposed and are wide spaced from one another relative to the diameters of the balls, outer ball races, sets of balls which are retained between inner and outer race members and which are forced up the conical inner raceway slopes by axial compression between said inner and outer race members, and supporting means preventing radial displacement of said outer races.

4. An electron tube having an evacuated envelope and a rotatable electrode therein, the mounting for the rotatable electrode including an inner shaft having thereon inner ball bearing raceways including surfaces which slope relatively to the axis of rotation and are oppositely disposed and are wide spaced from one another relative to the diameters of the balls, outer ball races, balls between the inner and outer ball races which balls are forced up the inner raceway slopes by axial pressure applied to them by the outer races, resilient compression means for maintaining said axial pressure on the outer races, and supporting means for the outer races preventing radial displacement thereof.

5. An electron tube having an evacuated envelope and a rotatable electrode therein, the mounting for the rotatable electrode including an inner shaft having thereon inner ball bearing raceways including surfaces which slope relatively to the axis of rotation and are oppositely disposed and are wide spaced from one another relative to the diameters of the balls, outer ball races, balls between the inner and outer ball races which balls are forced up the inner raceway slopes by axial pressure applied to them by the outer races, and supporting means for the outer races preventing radial displacement thereof.

6. An electron tube having an evacuated envelope and a rotatable electrode therein, the mounting for the rotatable electrode including an inner shaft having thereon two inner ball bearing raceways including concave surfaces which are inclined relatively to the axis of rotation and are oppositely disposed and are wide spaced from one another relative to the diameters of the balls, outer ball races, which outer races are held within retaining means to prevent their radial displacement, balls between the inner and outer ball races which balls are forced up the inner raceway slopes as a result of axial pressure supplied by the outer races, and resilient means supplying the axial pressure to at least one of the outer races.

7. An electron tube having an evacuated envelope and a rotatable electrode therein, the mounting for the rotatable electrode including an inner shaft having thereon inner ball bearing raceways including concave surfaces which are inclined relatively to the axis of rotation and are oppositely disposed so that the concavities face one another and are wide spaced from one another relative to the diameters of the balls, outer ball races, a retaining means for preventing radial displacement of the outer races and for securing one of the outer races against axial movement, balls retained between said inner and outer ball races, and resilient means in compression between the outer ball bearing races exerting upon said races force which causes the balls to ride up the inner raceway slopes.

8. An electron tube having an evacuated envelope and a rotatable electrode therein, the mounting for the rotatable electrode including an inner shaft having thereon inner ball bearing raceways, including concave surfaces which are inclined relatively to the axis of rotation and are oppositely disposed so that the concavities face in opposite directions and are wide spaced from one another relative to the diameters of the balls, outer ball races, balls retained in the races in contact with the sloping surfaces of the inner races, a retaining means for the outer races preventing radial displacement thereof, and a member in contact with the retaining means and one of the outer races which member is adjustable axially with respect to the retaining means in order to exert an axial force upon said outer race, which force is applied to the balls to force said balls up the inner raceway slopes.

9. An electron tube having an evacuated envelope and a rotatable electrode therein, the mounting for the rotatable electrode including a rotatable shaft to which the rotatable electrode is affixed, said shaft having thereon inner ball bearing raceways including concave surfaces which are inclined relatively to the axis of rotation and are oppositely disposed so that the concavities face one another and are wide spaced from one another relative to the diameters of the balls, outer ball races, sets of balls between the inner and outer races, a cylindrical housing for retaining the outer ball races, means for securing one of the outer races within the housing against axial movement, and a spring in compression between the outer races exerting thereon pressure which forces the balls up the inner raceway slopes.

10. An X-ray tube having an evacuated envelope and a rotatable target therein, the mounting for the rotatable target including a rotatable shaft to which the rotatable target is affixed, said shaft having thereon a pair of inner ball bearing raceways including concave surfaces which are inclined relatively to the axis of rotation and are oppositely disposed so that the concavities face one another and are wide spaced from one another relative to the diameters of the balls, a pair of outer ball races, sets of balls between the inner and outer races, a cylindrical housing fixed relative to the vacuum envelope, means for securing one of the outer races within the housing against axial movement and a spring in compression between the outer races exerting thereon pressure which forces the balls up the inner raceway surfaces.

11. An electron tube having an evacuated envelope and a rotatable electrode therein, and a mounting for the rotatable electrode including two relatively rotatable members one extending within the other, two sets of balls between said members and wide spaced from one another relative to the diameters of the balls, two ball bearing raceways for the two sets of balls so mounted on the outer of said members as to exert axial pressure upon their respective sets of balls, and two ball bearing raceways on the inner of said members opposite the outer raceways, each of said inner raceways consisting of a slope inclined to the axis of rotation arranged so that the two raceway slopes are oppositely disposed and so that the balls under axial pressure from the outer races are forced up the inner raceway slopes.

12. An electron tube having an evacuated envelope and a rotatable electrode therein, and a mounting for the rotatable electrode including two relatively rotatable members one extending within the other, two sets of balls between said members and wide spaced from one another relative to the diameters of the balls, two ball bearing raceways for the two sets of balls mounted on the outer of said members, a resilient compression means mounted relative to the outer member to cause the outer races to exert axial pressure upon their respective sets of balls, and two ball bearing raceways on the inner of said members, each of said inner raceways consisting of a slope inclined to the axis of rotation arranged so that the two raceway slopes are oppositely disposed and so that the balls under axial pressure from the outer races are forced up the inner raceway slopes.

13. An electron tube having an evacuated envelope and a rotatable electrode therein, and a mounting for the rotatable electrode including two relatively rotatable members one extending within the other, two sets of balls between said members and wide spaced from one another relative to the diameters of the balls, two ball bearing raceways for the two sets of balls mounted on the outer of said members, resilient means within the outer member and acting upon the outer races to exert axial pressure upon their respective sets of balls, and two ball bearing raceways on the inner of said members, each of said inner raceways consisting of a concave slope inclined to the axis of rotation arranged so that the two raceway slopes are oppositely disposed so that the concavities face in opposite directions and so that the balls under axial pressure from the outer races are forced up the inner raceway slopes.

GEORGE J. AGULE.

References Cited in the file of this patent

UNITED STATES PATENTS

| Number | Name | Date |
| --- | --- | --- |
| 680,567 | Cottrell | Aug. 13, 1901 |
| 1,401,349 | Miquet | Dec. 27, 1921 |
| 2,141,924 | Middel | Dec. 27, 1938 |
| 2,230,858 | Atlee | Feb. 4, 1941 |

FOREIGN PATENTS

| Number | Country | Date |
| --- | --- | --- |
| 33,419 | Norway | Oct. 31, 1921 |
| 559,067 | France | Nov. 24, 1922 |